US006931865B1

(12) United States Patent
Van Gilder et al.

(10) Patent No.: US 6,931,865 B1
(45) Date of Patent: Aug. 23, 2005

(54) METHOD AND APPARATUS FOR DETERMINING COOLANT TEMPERATURE RATIONALLY IN A MOTOR VEHICLE

(75) Inventors: John F. Van Gilder, Webberville, MI (US); William J. Morgan, Dewitt, MI (US); Randall L. Gallagher, Capac, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/781,452

(22) Filed: Feb. 18, 2004

(51) Int. Cl.$^7$ .............. G01K 13/00; G01M 17/00; G01M 19/00; F01P 9/00
(52) U.S. Cl. ............. 62/129; 701/34; 73/118.1; 123/41.01
(58) Field of Search .............. 62/126, 129; 701/29, 701/34, 36, 101, 113; 73/116, 118.1, 119 R; 123/41.01; 340/449

(56) References Cited

U.S. PATENT DOCUMENTS

| | | | | |
|---|---|---|---|---|
| 5,714,673 A | * | 2/1998 | Bidner et al. ............. 73/1.57 |
| 5,781,877 A | * | 7/1998 | Rachel et al. ............. 701/104 |
| 6,128,948 A | * | 10/2000 | Shi et al. ................. 73/118.1 |
| 6,302,065 B1 | * | 10/2001 | Davison .................. 123/41.15 |
| 6,393,357 B1 | * | 5/2002 | Holmes et al. ............ 701/115 |
| 6,463,892 B1 | * | 10/2002 | Russell .................... 123/41.15 |
| 6,714,854 B2 | * | 3/2004 | Linenberg et al. .......... 701/113 |
| 6,732,025 B2 | * | 5/2004 | Reese et al. ................ 701/29 |
| 6,848,434 B2 | * | 2/2005 | Li et al. ................. 123/568.12 |
| 2002/0099482 A1 | * | 7/2002 | Reese et al. ................ 701/29 |

* cited by examiner

Primary Examiner—Marc Norman
(74) Attorney, Agent, or Firm—Christopher DeVries

(57) ABSTRACT

Methods, systems and devices for identifying irrational results from an engine coolant temperature (ECT) sensor in a vehicle are described. The vehicle suitably includes a processor in communication with the ECT sensor and an intake air temperature (IAT) sensor. The method includes the steps of receiving an ECT reading from the ECT sensor and a IAT reading at the processor, evaluating a temperature difference between the ECT reading and the IAT reading to determine if irrationality is present, and providing a fault indication in response to the evaluating step. The evaluating step includes monitoring the IAT reading during operation of the vehicle to identify the presence of an engine block heater if the temperature difference exceeds a pre-determined threshold.

23 Claims, 5 Drawing Sheets

METHOD AND APPARATUS FOR DETERMINING COOLANT TEMPERATURE RATIONALLY IN A MOTOR VEHICLE

TECHNICAL FIELD

The present invention generally relates to engine controls, and more particularly relates to techniques and devices for identifying faults in engine temperature sensors.

BACKGROUND

Most automobiles, trucks and other motor vehicles are affected by changing temperatures. For example, many internal combustion engines are more difficult to start in cold temperatures than in warm temperatures, so many modern vehicle fuel control systems adjust the start-up crank or crank-run transition fueling during cold weather to make the engine more likely to start. Accordingly, most vehicles now include an engine coolant temperature (ECT) sensor that monitors the temperature of the engine coolant during startup and operation of the vehicle. Temperature information from the ECT can be provided to a powertrain control module (PCM), engine control unit (ECU) or other controller to adjust various engine parameters to optimize performance across a wide range of operating temperatures. Similarly, ECT data may be used for diagnostic monitoring, activating various engine functions (e.g. an exhaust gas recirculation (EGR) valve or torque converter clutch) at desired temperatures, adjusting transmission shift points, varying spark advance or idle speeds, and/or many other functions.

Because vehicle exhaust generates a large percentage of air pollutants, particularly in major cities, several state, municipal and federal government agencies regulate the emissions produced by certain vehicles. The United States Environmental Protection Agency (EPA) and the California Air Reduction Board (CARB) are examples of government agencies currently regulating vehicle emissions. The On Board Diagnostic (OBD2) regulations promulgated by the EPA, for example, not only limit the amount of emissions legally produced by a vehicle, but also require that each vehicle monitor the emissions produced and issue a notification to the driver if emissions exceed a specified threshold. Because the ECT is used to adjust various engine operating parameters (e.g. fuel mixture), faults in the ECT sensor may be related to production of excess pollutants in vehicle exhaust. OBD2 and other regulations therefore require that vehicles detect sensor faults, including faults in the ECT sensor.

In particular, the OBD2 regulations require that the vehicle identify any upward bias of the ECT sensor. Monitoring the performance of the ECT sensor may be complicated, however, by the presence of an engine block heater or similar device. Because the block heater warms the engine coolant while the engine is not running, it can be difficult for the engine controller to differentiate between actual temperature increases created by the block heater and false increases created by a sensor fault.

Accordingly, it is desirable to formulate a technique for identifying irrational ECT sensor data even if an engine block heater is present in the vehicle. Furthermore, other desirable features and characteristics will become apparent from the subsequent detailed description and the appended claims, taken in conjunction with the accompanying drawings and the foregoing technical field and background.

BRIEF SUMMARY

Various embodiments relate to methods, systems and devices for identifying irrationality in an engine coolant temperature (ECT) sensor in a vehicle. In one aspect, the vehicle suitably includes a processor in communication with the ECT sensor and an intake air temperature (IAT) sensor. An ECT reading from the ECT sensor and a IAT reading from the IAT sensor are received at the processor, and evaluated to determine if the ECT data is irrational. In an exemplary embodiment, a temperature difference between the ECT reading and the IAT reading is computed. If the temperature difference exceeds a pre-determined threshold, the IAT reading is monitored during operation of the vehicle to identify the presence of an engine block heater. A block heater may be identified by, for example, a decrease in IAT during initial vehicle operation. In a further exemplary embodiment, the difference between the air and coolant temperatures is further evaluated to conclude that irrationality is not present if the difference is less than a first threshold and/or to immediately conclude that a fault is present if the temperature difference initially exceeds the difference that would be produced by an engine block heater. In a still further embodiment, default temperature values may be supplied in the event of a sensor fault to assist in starting the vehicle or otherwise improving vehicle performance.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, irrational results from an engine coolant temperature (ECT) sensor are identified by observing differences between observed values of the coolant temperature and the temperature of intake air (IAT) after the vehicle has been inactive (e.g. ignition turned off) for an appropriate period of time. If the vehicle has been inactive ("soaking" in ambient air) for sufficient time, the coolant temperature will typically be approximately equal to the air temperature. If the controller identifies large differences between the coolant temperature and the air temperature after a prolonged soak, the difference can be attributed to either a block heater or a faulty temperature sensor. The presence of an active block heater is therefore determined by observing the air temperature as the vehicle is moving; if the air temperature decreases as the vehicle begins to move, the change in temperature is likely due to an engine block heater. If the air temperature rises or remains constant following vehicle movement, however, the temperature difference may be more likely attributed to a sensor fault. In further embodiments, default values for engine coolant temperature may be used when sensor faults are identified to improve engine startup and/or performance until the sensor is replaced or repaired.

Figure 1:
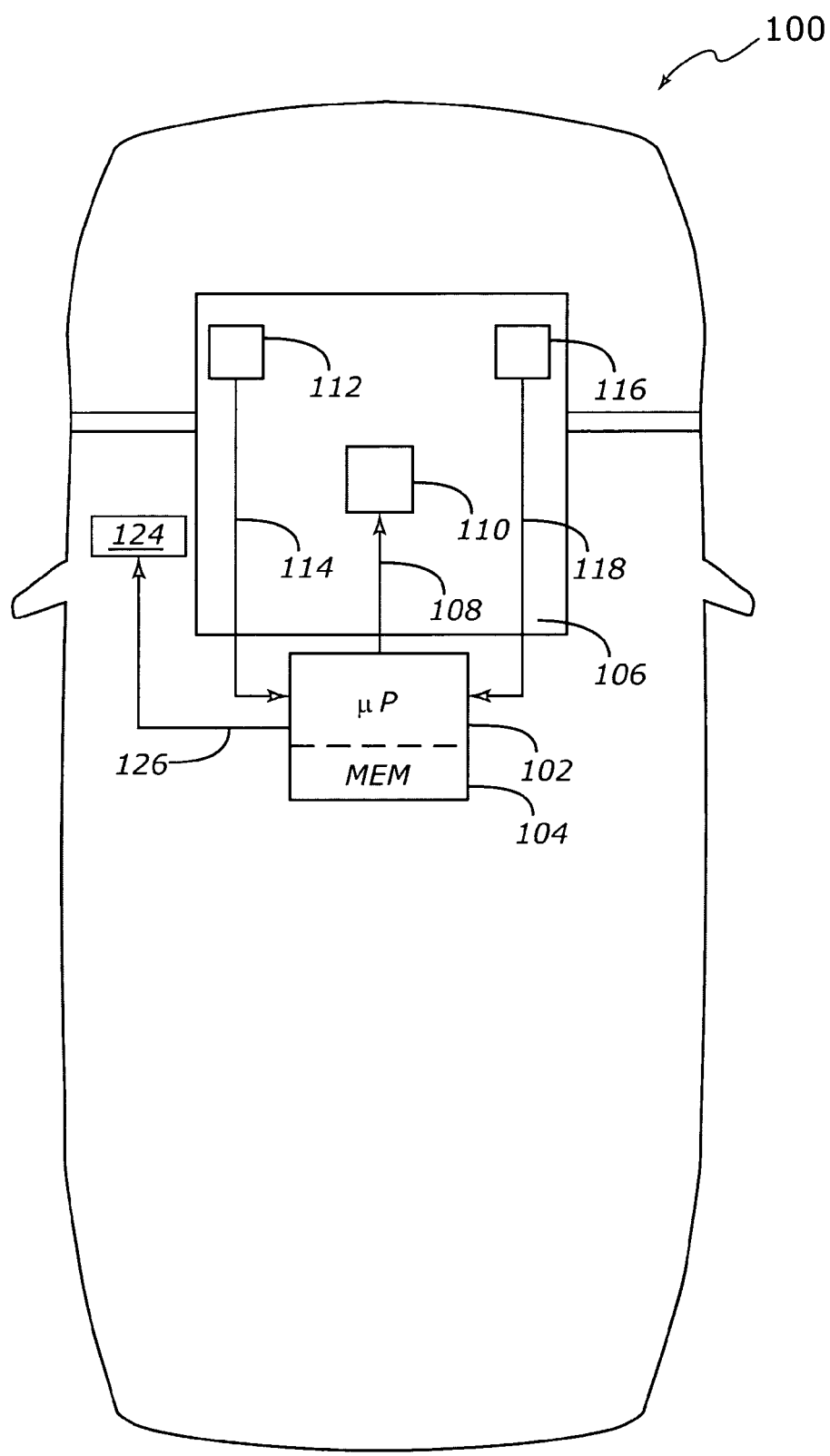
FIG. 1 is a block diagram of an exemplary vehicle.

Turning now to the drawing figures and with initial reference to FIG. 1, an exemplary vehicle 100 suitably includes a controller 102, a memory 104, one or more sensors 112, 116, a controlled engine component 110 and an optional display 124. Controller 110 receives sensor data 114, 118 from sensors 112, 116 (respectively) and processes the data to produce a control signal 108 and/or an output 126 to display 124. In an exemplary embodiment, sensors 112, 116 are temperature sensors that provide temperature indications 114, 118 to controller 102. Controller 102, in turn, provides a control signal 108 based upon temperature indications 114, 118 to any controllable component 110 of engine 106.

Controller 102 is any device capable of processing input information 114, 118 to generate output signals 108 and/or 126, such as any type of microcontroller, microprocessor, application specific integrated circuit (ASIC) or other device. Examples of various controllers 102 include electronic control units (ECUs) or power train control modules (PCMs) commonly found on many production vehicles. Memory 104 is any static, dynamic, flash or other type of random access or read-only memory capable of storing instructions and/or data for controller 102. In an exemplary embodiment, controller 102 is a digital microcontroller with associated memory 104 and input/output circuitry on a single board, although other hardware implementations could be used in a wide array of alternate embodiments. The digital microcontroller board may also include analog to digital conversion circuitry for converting sensor inputs 114, 118 as appropriate.

Input data for controller 102 is provided by any number of sensors. Sensors 112, 116 are any devices or systems capable of detecting air or fluid temperatures and of providing an output indication 114, 118. In various embodiments, sensor 112 is an engine coolant temperature (ECT) sensor that is capable of monitoring the temperature of the coolant flowing through a radiator associated with engine 106 and sensor 116 is an air temperature (IAT) sensor capable of monitoring the temperature in the air intake manifold. One type of temperature sensor that may be used to sense ECT and/or IAT is a thermister-type sensor in which the electrical resistance of a thermister is affected by changes in temperature. Such sensors typically exhibit a lower electrical resistance as temperature increases, and vice versa. Alternate embodiments, however, may include other types of temperature sensors such as thermocouples, thermometers, bimetallic sensors and/or the like. Sensor output signals 114, 188 may be provided to controller 102 in any digital or analog encoding format, such as in a digital pulse coded modulated (PCM) or similar format.

Component 110 is any device or system related to engine 106 that is capable of receiving a control signal 108 from controller 102. In various embodiments, component 110 may be any type of fuel injection or fuel control system, exhaust system or other the like. Alternatively, component 110 may represent any valve, actuator, switch or other device related to engine 106. Control signal 108 is provided in any digital or analog coding format, including PCM or the like.

Display 124 is any type of audible, visual or other feedback device capable of providing information to a driver, technician or other user of vehicle 100 in response to control signal 126. In an exemplary embodiment display 124 is implemented as a dashboard light or other feedback device within the passenger compartment of vehicle 100. Control signal 126 may be any type of analog or digital electrical signal, or may include multiple signals arranged in any format (e.g. ASCII or other multi-bit messages sent to a diagnostic computer, storage device, or the like).

In operation, controller 102 suitably receives input data 114, 118 from one or more sensors 112, 116 and processes the data to generate and provide one or more output signals 108, 126 to engine component 110 and/or to feedback device 124. Software instructions stored in memory 104 are executed by processor 102 to implement any desired control, monitoring or diagnostic functions. As mentioned above, temperature data 114, 118 may be appropriately processed by processor 102 to implement diagnostic monitoring, activating various engine functions (e.g. operating an exhaust gas recirculation (EGR) valve or torque converter clutch) at desired temperatures, adjusting transmission shift points, varying spark advance or idle speeds, and/or any number of alternate functions. Accordingly, the various concepts and devices set forth herein may be used to control any portion or portions of engine 106, or may be used simply to provide feedback to a driver or other user of vehicle 100.

Figure 2:
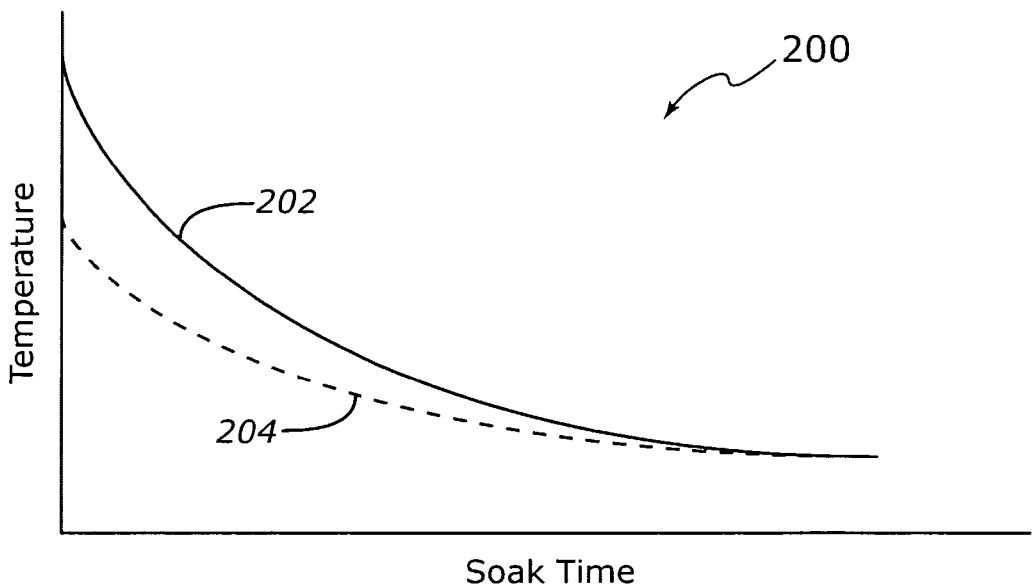
FIG. 2 is a plot of an exemplary temperature scenario when an engine block heater is not active in the vehicle.

As discussed briefly above, government regulations in the United States and elsewhere require that each vehicle 100 identify operating faults with various sensors that could affect vehicle emissions, including ECT sensor 112. Moreover, faults or errors in ECT sensor 112 could adversely affect engine performance. It is therefore advantageous for vehicle 100 to verify that ECT sensor 112 is producing rational output during its operation. One technique for testing the rationality of a sensed engine coolant temperature involves comparing the output temperature observed by ECT sensor 112 with the output of another temperature sensor (e.g. sensor 118) when the temperatures observed by the two sensors can be reasonably expected to be approximately equal to each other. FIG. 2 shows an exemplary plot of coolant temperature 202 and air temperature 204 as the vehicle "soaks" in ambient air over time. This "soak" refers to exposure to ambient air or other environmental effects for a period of time over which engine 106 is not operating (e.g. when the ignition is turned off). Most conventional PCMs and ECUs presently track the time elapsed since engine shutoff, so soak time is relatively easy to monitor in controller 102.

As shown in FIG. 2, both coolant temperature 202 and air temperature 204 approach the temperature of the ambient air as the soak time increases. Stated another way, if the engine remains inactive for a sufficient period of time (typically on the order of several hours or more), coolant temperature 202 and air temperature 204 will be approximately equal, typically within several degrees of each other. Accordingly, if the engine coolant temperature 202 exceeds the air temperature by more than several degrees after a prolonged soak, a fault or error in ECT sensor 114 is a likely cause of the temperature difference.

Figure 3:
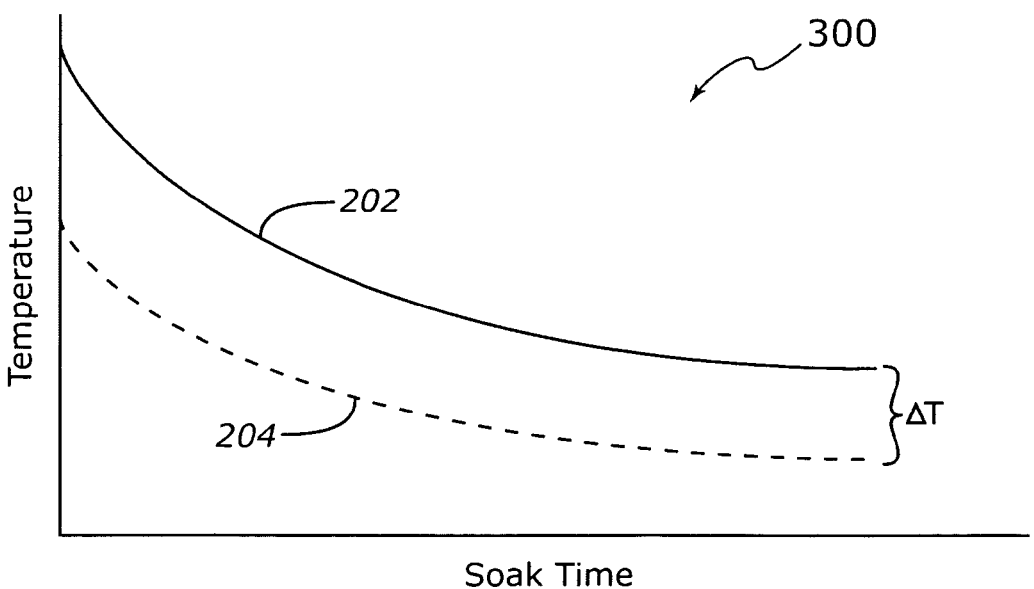
FIG. 3 is a plot of an exemplary temperature scenario when an engine block heater is active in the vehicle.

An active engine block heater in vehicle 100, however, can skew the results shown in FIG. 2. Because block heaters are typically designed so that the engine coolant absorbs significantly more heat from the block heater than the surrounding air, coolant temperature 202 and air temperature 204 will not converge if a block heater is active, as shown in FIG. 3. As shown in plot 300 of FIG. 3, the block heater produces a temperature difference (ΔT) between coolant temperature 202 and air temperature 204. This temperature difference may be on the order of 10–15 degrees centigrade or so, and may vary significantly in other embodiments depending upon vehicle type, engine type, heater type and configuration, weather conditions and/or other factors. Difficulties in identifying sensor faults therefore arise, since controller 102 may have difficulty in determining whether temperature differences following a prolonged soak are due to an undesirable sensor fault or an active engine block heater.

Figure 4:
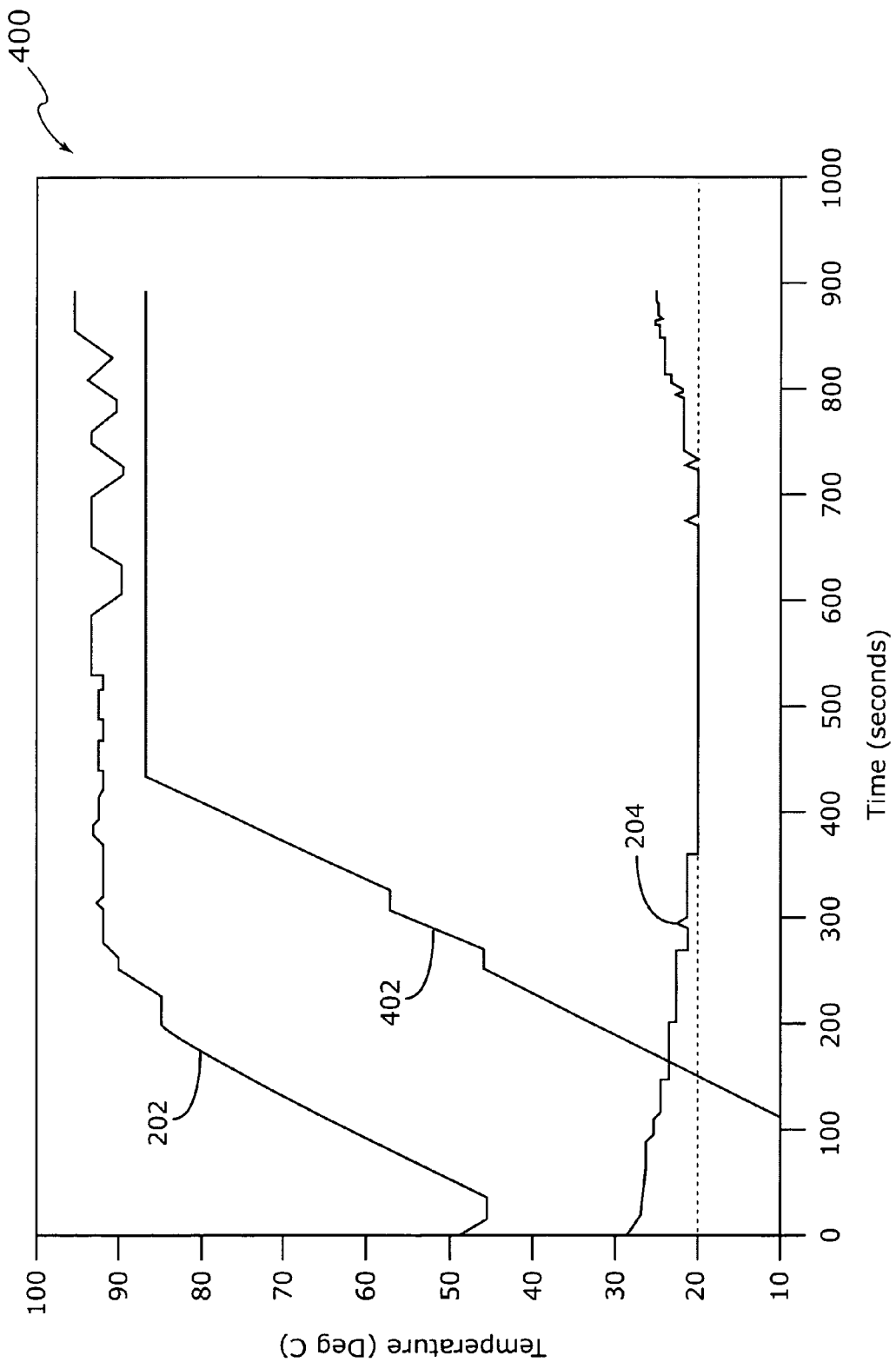
FIG. 4 is a plot of an exemplary temperature scenario following startup and drive-away of a vehicle with an active engine block heater.

Referring now to FIG. 4, plot 400 shows exemplary values for coolant temperature 202 and air temperature 204 following engine startup and vehicle drive-away (indicated by line 402) of a vehicle 100 with an active engine block heater. As shown in FIG. 4, coolant temperature 202 quickly warms to its operating temperature following startup. Air temperature 204, however, briefly decreases following startup. Because the intake air absorbs a slight amount of heat from the block heater during the soak period, air temperature 204 is typically slightly warmer than the ambient air when the vehicle is started. As the vehicle drives away, air entering the intake manifold is actually cooler than the heated air, thus resulting in the decrease in intake air temperature immediately following startup. Although the magnitude of the decrease varies significantly from embodiment to embodiment (e.g. from about 2 degrees to about 10 degrees Celcius), the experimental data in FIG. 4 shows the difference between the startup temperature and the minimum observed temperature as approximately 8 degrees Celsius. This temperature drop would not be observed in a vehicle that does not have an active engine block heater, since the startup air temperature would typically be approximately equal to the ambient air temperature. By monitoring the intake air temperature to identify temperature drops following vehicle startup, then, the presence or absence of an active engine heater can be identified. This information can be used in conjunction with the temperature difference between the coolant and the intake air to further evaluate the rationality of ECT sensor output 116, which in turn can be used to identify faults in ECT sensor 114 (FIG. 1), as described more fully below.

Figure 5:
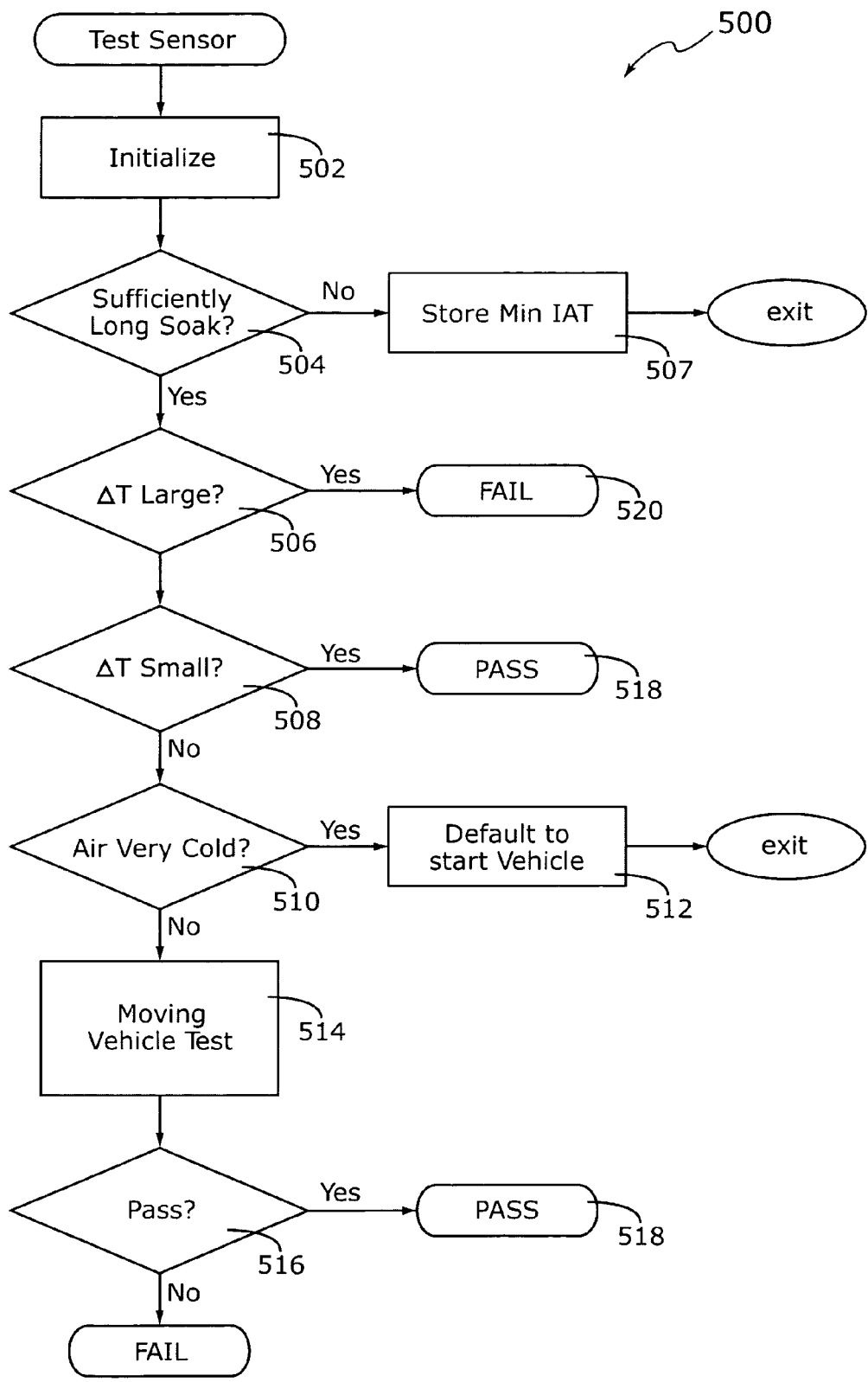
FIG. 5 is a flowchart of an exemplary technique for identifying faults in an engine coolant temperature sensor.
Figure 6:
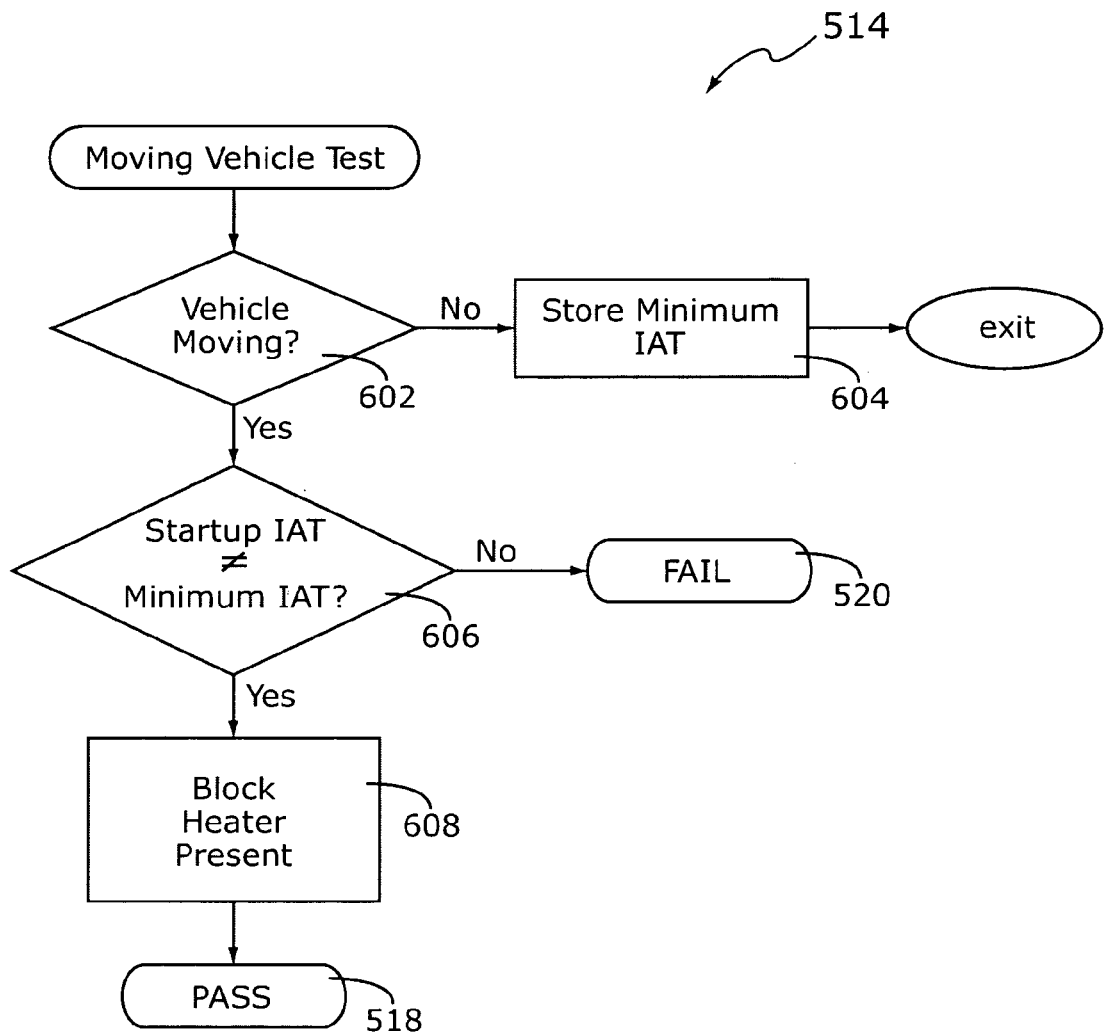
FIG. 6 is a flowchart of an exemplary technique for determining if a temperature difference is created by an engine block heater.

FIGS. 5 and 6 are flowcharts of exemplary processes that may be executed within vehicle 100 to evaluate the rationality of ECT sensor data 116 in view of the observations set forth above. The various evaluation routines may be implemented with computer-executable software instructions stored in memory 104 and executed by controller 102, for example. In various embodiments, the various routines are stored as compiled object code within memory 104, although alternate embodiments may implement the concepts described herein with any type of interpreted or compiled code stored in any digital storage medium, including any memory, disk drive, optical drive, compact disk, floppy disk or other storage device. The flowcharts shown in FIGS. 5 and 6 are intended to be logical models for exemplary embodiments; other embodiments may incorporate various changes to the logic, arrangement and combinations of functions shown in the figures without departing from the general concepts set forth herein.

Referring now to FIG. 5, an exemplary process 500 for evaluating the rationality of a temperature sensor output suitably includes the broad steps of determining whether the differences between coolant temperature and intake air temperature are inordinately large (step 504) or sufficiently small (step 508) to immediately fail or pass (respectively) the sensor output. If the temperature difference is neither "high" nor "low", the IAT is monitored during vehicle operation (step 514) to determine whether the temperature differences are due to a block heater or a sensor fault.

The rationality testing process 500 suitably begins by initializing the analysis routine as appropriate (step 502). Initialization 502 may include obtaining data from the sensors, loading data or instructions into memory, and the like. Initialization 502 also includes initializing any software routines, such as by obtaining access to processor 102 and/or identifying any memory faults or other disabling malfunctions that may prevent proper execution of process 500. In various embodiments, process 500 may set an interrupt bit or other flag while the routine is executing to prevent other processes from gaining access to controller 102 during execution, although this step is optional and not found in many embodiments.

After initializing the hardware and software environment as appropriate, process 500 determines whether the engine has been soaking (inactive) for a sufficient period of time to produce meaningful results (step 504). The minimum soak time varies from vehicle to vehicle, but may be on the order of five to eight hours or so such that the ECT and IAT have time to cool to a stable value for the ambient air surrounding the engine, as shown in FIGS. 2 and 3.

If the engine has not been soaking for a sufficiently long period, process 500 may still record the IAT observed if the IAT is the lowest observed value since engine shutdown (step 507). The minimum observed IAT may be beneficial in recognizing the presence of a block heater, as described more fully below. In a further embodiment, the IAT may be observed over time to determine whether the vehicle has been soaking for sufficient time. That is, if the IAT does not change significantly over a period of time, it can be readily assumed to have reached its "steady state" value, and can therefore be meaningfully analyzed. Minimum observed IAT values may be stored in a register associated with processor 102, in memory 104, or in any other convenient location for subsequent processing.

If the engine has been soaking for a sufficiently long period to produce meaningful results, process 500 determines if a sensor fault is present by calculating the difference between the ECT and the IAT (shown as ΔT in FIG. 3). If the difference is large enough that the difference could not have resulted from an engine block heater (step 506), a sensor fault may be identified. Step 506 may be implemented by comparing the temperature difference (ΔT) to an upper threshold value that is greater than the temperature difference generated by an engine block heater. If the difference exceeds upper threshold, a fault is the likely cause. The upper threshold value may be experimentally determined based upon the particular make, model and configuration of vehicle 100, but may be on the order of about twenty degrees Celsius in an exemplary embodiment.

Conversely, if the difference between the ECT and the IAT is sufficiently small, process 500 may readily conclude that no faults are present in sensor 112 (step 508). Step 508 may compare the temperature difference to a minimum threshold that is suited to the particular vehicle and that provides sufficient assurance that false results do not occur. To that end, the minimum threshold is selected to be sufficiently low to ensure that the temperature difference is not significant, yet sufficiently high to prevent an inordinate number of "false positive" results. In an exemplary embodiment, the minimum threshold is less than about 5 degrees, perhaps on the order of 2 to 3 degrees or so, although other embodiments may use other values as appropriate.

In various embodiments, process 500 may be configured to check for extreme or unusual conditions such as very cold weather (step 510). In the event of unusual conditions (e.g. temperatures below about −15 degrees or so Celsius), process 500 may override traditional control processing to provide a default value to any controlled components 110 to aid in starting or operating the engine for the particular conditions encountered. Controller 102 may provide a control signal 108 to a component 110 controlling fuel/air mixture, for example, that provides an unusually rich fuel mixture to aid in starting the engine during very cold conditions. Steps 510 and 512 are optional, and may not be present in all embodiments. Similarly, steps 510 and 512 may be modified significantly, and may be executed at any point during process 500, including before or after any other rationality testing, such as in initialization step 502.

If the difference between the ECT and the IAT is neither sufficiently high nor sufficiently low to readily conclude that the sensor passes or fails rationality testing, process 500 evaluates the changes in IAT monitored after vehicle startup (step 514). An exemplary process for evaluating the IAT as the vehicle is moving is described below in conjunction with FIG. 6.

By evaluating the temperature difference between the ECT and the IAT and by monitoring IAT after startup, as appropriate, process 500 suitably concludes that the ECT sensor either passes or fails rationality testing (step 516). If the sensor 112 fails rationality testing, it may be readily concluded that a fault, malfunction or other issue exists with the sensor that is producing irrational results. Outputs from process 500 may vary widely from embodiment to embodiment. In an exemplary embodiment, process 500 adjusts a control signal 108 (FIG. 1) to a fuel injection system or other component 110 in engine 106 in response to passing or failing results. As briefly mentioned above, process 500 may provide default control values in the event of a failing result to aid in starting the engine, or to improve vehicle performance. If ECT sensor 112 is discovered to be biased (steps 520), for example, temperatures used to compute control signals 108 may be adjusted or defaulted to compensate for the observed deviation. Similarly, if an irrationality is discovered by process 500, a warning light or other indicator on display 124 may be illuminated or otherwise provided. Passing results (step 518) may be provided to other processes executing in controller 102, or may be otherwise used in controlling one or more aspects of engine 106 as described above.

With reference now to FIG. 6, an exemplary process 514 for evaluating the IAT after vehicle startup suitably includes the broad steps of determining if the vehicle is moving (step 602) and monitoring the IAT during vehicle movement (step 606) to identify any decreases. As described above in conjunction with FIG. 4, vehicles with active engine block heaters will exhibit a decrease in IAT following startup and drive-away as colder ambient air replaces the intake air that has been slightly warmed by the heater.

As the vehicle moves following engine startup (step 602), the process suitably monitors the IAT to determine the minimum observed IAT over an appropriate period of time (e.g. on the order of 4–6 minutes) following startup. One technique for maintaining the minimum temperature involves checking the IAT at regular or irregular intervals and maintaining the lowest observed temperature in memory (step 604). If the IAT observed at engine startup is approximately equal to the minimum IAT observed over the relevant time period (step 606), then no temperature decrease is observed and the process may conclude that no active engine block heater is present. Conversely, if the minimum observed IAT differs from the startup MAT, the temperature change can be attributed to an active engine block heater (step 608). If the block heater is present, the ECT observed by sensor 112 is rational, and the sensor passes the test (step 518). On the other hand, if relatively little or no temperature change is observed, it can be deduced that no block heater is active and that the readings provided by ECT sensor 112 are likely irrational, leading to a failing result (step 520).

Accordingly, a new control system for a vehicle suitably includes rationality testing for coolant temperature sensors that is able to differentiate between true sensor faults and the presence of an engine block heater. Other aspects of the various embodiments include rationality testing techniques as described herein, software code that implements the various techniques, and various other methods, devices and systems as described by the following claims and their legal equivalents.

While at least one exemplary embodiment has been presented in the foregoing detailed description, a vast number of variations exist. The various processing steps described herein may be practiced in any order, for example, or may be mathematically or logically altered in any number of equivalent embodiments without departing from the concepts described herein. The exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the function and arrangement of elements set forth herein without departing from the scope of the invention as set forth in the appended claims and the legal equivalents thereof.

What is claimed is:

1. A method of testing an engine coolant temperature (ECT) sensor in a vehicle comprising a processor in communication with the ECT sensor and an intake air temperature (IAT) sensor, the method comprising the steps of:
   receiving an ECT reading from the ECT sensor and a IAT reading at the processor;
   evaluating a temperature difference between the ECT reading and the IAT reading to determine if an irrationality is present, wherein the evaluating step comprises monitoring the IAT reading during operation of the vehicle to identify the presence of an engine block heater if the temperature difference exceeds a predetermined threshold; and
   providing a rationality indication in response to the evaluating step.

2. The method of claim 1 wherein the evaluating step comprises comparing the temperature difference to a second threshold, and providing a pass indication if the difference is less than a second threshold.

3. The method of claim 1 wherein the monitoring portion of the evaluating step comprises observing a decrease in the IAT reading during operation of the vehicle to thereby identify the presence of the engine block heater.

4. The method of claim 3 wherein the observing step comprises concluding that the engine block heater is present if the decrease in the IAT reading exceeds a third threshold.

5. The method of claim 1 wherein the providing step comprises providing a default value if the irrationality is identified in the evaluating step.

6. A method of identifying irrationality in an engine coolant temperature (ECT) sensor in a vehicle comprising a processor in communication with the ECT sensor and an intake air temperature (IAT), the method comprising the steps of:

computing a difference between an ECT received from the ECT sensor and a IAT received from the IAT sensor to determine a temperature difference;

evaluating the temperature difference to identify irrationality in the ECT sensor, wherein the evaluating step comprises:

if the temperature difference is less than a first threshold, determining a "pass" condition;

if the temperature difference exceeds a second threshold, determining a "fail" condition; and if the temperature difference lies between the first threshold and the second threshold, monitoring the IAT during operation of the vehicle to determine whether an engine block heater is present in the vehicle; and providing an indication if an irrationality in the ECT sensor is identified during the evaluating step.

7. The method of claim 6 wherein the monitoring portion of the evaluating step comprises determining if the engine block heater is present in the vehicle based upon a drop in the IAT during operation of the vehicle.

8. The method of claim 6 wherein the providing step comprises providing a default value if irrationality is identified in the evaluating step.

9. A data processing system for a vehicle, the data processing system comprising:

an engine coolant temperature (ECT) sensor configured to monitor the ECT of the vehicle;

an intake air temperature (IAT) configured to monitor the IAT of the vehicle; and a processor in signal communication with the ECT sensor and the IAT sensor to receive the ECT and the IAT, wherein the processor is configured to evaluate a temperature difference between the ECT and the IAT to determine if irrationality is present, to monitor the IAT during operation of the vehicle to identify the presence of an engine block heater if the temperature difference exceeds a pre-determined threshold, and to provide an indication if irrationality is present in the ECT sensor.

10. The data processing system of claim 9 wherein the processor is further configured to produce a control signal for an engine component of the vehicle, and wherein the control signal is produced as a function of the indication.

11. A data processing system for a vehicle comprising an engine coolant temperature (ECT) sensor configured to sense the ECT of the vehicle and an intake air temperature (IAT) configured to sense the IAT of the vehicle, the data processing system comprising:

a processor in signal communication with the ECT sensor and the IAT sensor to receive the ECT and the IAT; and a digital memory in communication with the processor, the memory having instructions executable by the processor stored therein, wherein the instructions comprise:

a first code module configured to evaluate a temperature difference between the ECT and the IAT to determine if irrationality is present;

a second code module configured to monitor the IAT reading during operation of the vehicle to identify the presence of an engine block heater if the temperature difference exceeds a pre-determined threshold; and a third code module configured to provide an indication if irrationality is present in the ECT sensor.

12. The data processing system of claim 11 wherein the digital memory further comprises a fourth code module configured to produce a control signal for a component of the vehicle as a function of the indication.

13. The data processing system of claim 12 wherein the digital memory further comprises a fifth code configured to provide a default value to the component if irrationality is identified in the evaluating step.

14. A digital storage medium having computer-executable instructions stored thereon for identifying irrationality in an engine coolant temperature (ECT) sensor in a vehicle comprising a processor in communication with the ECT sensor and an intake air temperature (IAT), wherein the computer-executable instructions comprise:

a first code module configured to evaluate a temperature difference between the ECT and the IAT to determine if irrationality is present;

a second code module configured to monitor the IAT during operation of the vehicle to identify the presence of an engine block heater if the temperature difference exceeds a pre-determined threshold; and a third code module configured to provide an indication if irrationality is present in the ECT sensor.

15. The data processing system of claim 14 wherein the instructions further comprise a fourth code module configured to produce a control signal for a component of the vehicle as a function of the indication.

16. The digital storage medium of claim 15 wherein the instructions further comprise a fifth code module configured to provide a default value to the component if irrationality is identified in the evaluating step.

17. A device for identifying irrationality in an engine coolant temperature (ECT) sensor in a vehicle comprising a processor in communication with the ECT sensor and an intake air temperature (IAT), the device comprising:

means for receiving an ECT reading from the ECT sensor and a IAT reading at the processor;

means for evaluating a temperature difference between the ECT reading and the IAT reading to determine if irrationality is present, wherein the evaluating means comprises means for monitoring the IAT reading during operation of the vehicle to identify the presence of an engine block heater if the temperature difference exceeds a pre-determined threshold; and means for providing an indication in response to the evaluating step.

18. The device of claim 17 further comprising means for producing a control signal for a component of the vehicle as a function of the indication.

19. The device of claim 18 further comprising means for providing a default value to the component if irrationality is identified in the evaluating step.

20. The device of claim 17 wherein the monitoring means comprises means for observing a decrease in the IAT reading during operation of the vehicle to thereby identify the presence of the engine block heater.

21. A device for testing an engine coolant temperature (ECT) sensor in a vehicle comprising a processor in communication with the ECT sensor and an intake air temperature (IAT), the device comprising:

means for computing a difference between an ECT reading received from the ECT sensor and a IAT reading received from the IAT sensor to determine a temperature difference;

means for evaluating the temperature difference to identify irrationality in the ECT sensor, wherein the evaluating means comprises:

means for determining a "pass" condition exists if the temperature difference is less than a first threshold;

means for determining a "fail" condition exists if the temperature difference exceeds a second threshold; and means for monitoring the IAT reading during operation of the vehicle to determine whether an engine block heater is present in the vehicle if the temperature difference lies between the first threshold and the second threshold;

means for providing an indication if the evaluating means identifies irrationality in the ECT sensor.

22. A data processing system for a controlling a component of a vehicle, the data processing system comprising:

an engine coolant temperature (ECT) sensor configured to sense the ECT of the vehicle;

an intake air temperature (IAT) configured to sense the IAT of the vehicle;

a processor in signal communication with the ECT sensor and the IAT sensor to receive the ECT and the IAT; and a digital memory in communication with the processor, the memory having instructions executable by the processor stored therein, wherein the instructions comprise:

a first code module configured to evaluate a temperature difference between the ECT and the IAT to determine if irrationality is present;

a second code module configured to monitor the IAT reading during operation of the vehicle to identify the presence of an engine block heater if the temperature difference exceeds a pre-determined threshold;

a third code module configured to provide an indication if irrationality is present in the ECT sensor; and a fourth code module configured to produce a control signal to the component as a function of the ECT and of the indication.

23. The digital storage medium of claim 22 wherein the instructions further comprise a fifth code module configured to provide a default value to the component if irrationality is identified in the evaluating step.

* * * * *